US008602369B2

(12) United States Patent
Rinaldi et al.

(10) Patent No.: US 8,602,369 B2
(45) Date of Patent: Dec. 10, 2013

(54) WATER METER MOUNTING BRACKET SYSTEM AND METHOD

(76) Inventors: David C. Rinaldi, Belton, MO (US); John T. Amrein, Bonner Springs, KS (US)

( * ) Notice: Subject to any disclaimer, the term of this patent is extended or adjusted under 35 U.S.C. 154(b) by 0 days.

(21) Appl. No.: 13/337,835

(22) Filed: Dec. 27, 2011

(65) Prior Publication Data
US 2012/0211615 A1 Aug. 23, 2012

Related U.S. Application Data

(60) Provisional application No. 61/445,354, filed on Feb. 22, 2011.

(51) Int. Cl.
*F16M 11/38* (2006.01)
*B42F 13/00* (2006.01)
*A47K 1/08* (2006.01)
*G01F 1/00* (2006.01)
*G01F 7/00* (2006.01)
*G01F 17/00* (2006.01)
*H01Q 1/04* (2006.01)

(52) U.S. Cl.
USPC ........ 248/213.2; 248/200; 248/343; 248/344; 248/312.1; 73/861; 73/195; 73/272 R; 343/719; 220/700; 220/701

(58) Field of Classification Search
USPC .................... 248/213.2, 200, 343, 344, 312.1; 73/861, 195, 272 R; 343/719; 220/700, 220/701
See application file for complete search history.

(56) References Cited

U.S. PATENT DOCUMENTS

| 2,660,333 | A | * | 11/1953 | Paxton | 220/701 |
| 4,266,686 | A | * | 5/1981 | Carter | 220/697 |
| 5,253,768 | A | * | 10/1993 | Traversa et al. | 211/65 |
| 6,378,817 | B1 | * | 4/2002 | Bublitz et al. | 248/200 |
| 6,616,110 | B1 | * | 9/2003 | McIntee | 248/213.2 |
| 6,820,848 | B1 | * | 11/2004 | Adam | 248/213.2 |
| 7,221,286 | B2 | * | 5/2007 | Gould et al. | 340/870.02 |
| 7,429,933 | B2 | * | 9/2008 | Brennan et al. | 340/870.07 |
| 8,011,628 | B1 | * | 9/2011 | Suddeth | 248/225.11 |

* cited by examiner

*Primary Examiner* — Terrell McKinnon
*Assistant Examiner* — Christopher Garft
(74) *Attorney, Agent, or Firm* — Dentons US LLP; Adam C. Rehm

(57) ABSTRACT

A bracket system and method to retrofit a subsurface water meter enclosure with a mount so as to provide secure positioning means suitable for components related to a water meter such as water-usage monitoring equipment. The system is only removable from the water meter enclosure via disassembling the water meter enclosure.

20 Claims, 5 Drawing Sheets

WATER METER MOUNTING BRACKET SYSTEM AND METHOD

CROSS-REFERENCE TO RELATED APPLICATION

This patent application claims priority to U.S. Provisional Patent Application No. 61/445,354 filed on Feb. 22, 2011 and titled MOUNTING BRACKET FOR A REMOTE-READ WATER METER RF TRANSMITTER UNIT, the entire contents of which is herein incorporated by reference in its entirety.

BACKGROUND

1. Field of the Invention

The present inventive concept generally relates to mounting systems for equipment related to utility meters. More specifically, embodiments of the present inventive concept concern a bracket system and method being particularly suitable for retrofitting a subsurface water meter enclosure with a mount so as to provide secure positioning means suitable for components related to a water meter housed in the water meter enclosure such as water-usage monitoring equipment.

2. Description of the Related Art

Residential and commercial consumers subscribe to various utilities, e.g., electricity, water, and gas, which are monitored by service providers who periodically charge the consumers based on usage. Utility monitoring is generally accomplished using remote-monitoring equipment having radio-frequency (RF) transmission and reception capabilities.

A remote-read meter uses an RF transmitter to send water consumption data to a remote-reading device. The remote-read water meter and RF transmitter are typically located at least partially enclosed within a subsurface enclosure to protect the meter and transmitter from damage that may be caused by exposure of the RF transmitter to the elements or inadvertent contact with machinery, e.g., freezing in cold weather or impact with a lawn mower. While some RF transmitters may be installed through the enclosure's lid, such are subject to the aforementioned damage.

Conventional methods for mounting RF transmitters utilize a pipe. The RF transmitter is propped up on one end of the pipe and the other end is stuck in the ground within the subsurface enclosure. Such convention methods are problematic because subsurface enclosures occasionally fill with water, which may cause the RF transmitter to float off or otherwise become detached from the pipe. Additionally, such conventional methods are difficult to install because subsurface enclosures do not have a uniform depth. Thus, the pipe must be cut to size for each installation in a subsurface enclosure.

Presently, there are no readily-available systems for securely positioning water-usage monitoring equipment in a subsurface enclosure. In view of the aforementioned problems, there is a need for a mounting system that is operable to be retrofitted to a subsurface enclosure of a water meter, is operable to safely and securely position related components, such as water-usage monitoring and signal-transmitting equipment, within the subsurface enclosure, is easily and economically manufactured, is easily installed, and does not materially interfere with the underlying purpose of the water-usage and signal-transmitting monitoring equipment and facilitates reliable operation thereof.

SUMMARY

The following summary is provided to indicate the nature of the subject matter disclosed herein. While certain aspects of the present inventive concept are described below, the summary is not intended to limit the scope of the present inventive concept.

Embodiments of the present inventive concept provide a bracket system and method for retrofitting a subsurface water meter enclosure with a mount so as to provide secure positioning means suitable for components related to a water meter housed in the water meter enclosure such as water-usage monitoring equipments. Additionally, the present inventive concept is easily and economically manufactured and easily installed.

The present inventive concept provides, in its simplest form, a frame having an interior bar network and/or screen configured to be permanently mounted over a grouping of taillight units and to an adjacent-mounting surface via a welding process. In this manner, the frame is only removable from the mounting surface via destroying weld marks produced during the welding process.

The aforementioned aspects may be achieved in one aspect of the present inventive concept by providing a water meter mounting bracket system. The system may include a frame and an interior component depending therefrom. The frame may define a planar void on an interior thereof. The frame may have an abutment surface operable to engage a surface of a water-meter enclosure having a lid. The interior component may be secured to the frame and at least partially spans the void. The interior component may have at least one receiver operable to (i) position a water-meter device within the water-meter enclosure, and/or (ii) prevent vertical displacement of the water-meter device when the lid is fitted to the water-meter enclosure.

The abutment surface of the frame may be annular in shape so that a surface of the frame is operable to be uniformly supported about an entire perimeter thereof when trapped between the surface of the water-meter enclosure and the lid of the water-meter enclosure. The interior component may include a vertical sidewall portion having an abutment surface operable to face a portion of the water-meter enclosure and/or prevent horizontal displacement of the frame relative to the water-meter enclosure when the lid is fitted to the water-meter enclosure. The at least one receiver of the interior component may be provided through a horizontal receiver portion of the interior component that extends perpendicular from the vertical sidewall portion of the interior component.

The system may further include a mounting assembly operable to secure the water-meter device to the at least one receiver of the interior component. The mounting assembly may include upper and lower abutment elements operable to be received on a threaded member of the water-meter device so that the upper and lower abutment elements are secured on opposing sides of interior component when the water-meter device is secured to the water meter mounting bracket. The upper abutment element may include a tool-receiving means that is exposed through the void of the frame when the water-meter device is secured to the water meter mounting bracket.

The interior component may span less than 50% of the void, and preferably spans approximately 33% of the void. The interior component may include a horizontal receiver portion having innermost and outermost edges, and/or a plurality of receivers spaced about the outermost edge of the horizontal receiver portion. The outermost edge of the horizontal receiver portion may have a radius substantially equal to a radius of the innermost edge of the horizontal receiver portion.

The aforementioned aspects may be achieved in another aspect of the present inventive concept by providing a method of manufacturing a water meter mounting bracket system.

The method may include the step of forming a frame having an abutment surface operable to engage a surface of a water-meter enclosure having a lid. The method may further include the step forming an interior component that depends from the frame and/or at least partially spans the void. The interior component may have at least one receiver operable to (i) position a water-meter device within the water-meter enclosure, and/or (ii) prevent vertical displacement of the water-meter device when the lid is fitted to the water-meter enclosure.

The abutment surface of the frame may be annular with an engagement surface that corresponds to and is operable to be received by, in its entirety, a portion of a water meter enclosure so that the frame is provided with uniform support when trapped between the surface of the water-meter enclosure and the lid of the water-meter enclosure. The interior component may include a vertical sidewall portion having an abutment surface operable to face a portion of the water-meter enclosure and prevent horizontal displacement of the frame relative to the water-meter enclosure when the lid is fitted to the water-meter enclosure. The at least one receiver of the interior component may be provided through a horizontal receiver portion of the interior component that extends perpendicular from the vertical sidewall portion of the interior component.

The aforementioned aspects may be achieved in another aspect of the present inventive concept by providing a method of mounting a component of a water meter to a bracket system. The method may include the step of securing a frame to a water-meter enclosure having a lid. The frame may have a planar void on an interior thereof and opposing abutment surfaces operable to engage surfaces of the water-meter enclosure and the lid. The method may further include the step of securing a water-meter device to an interior component that depends from the frame and/or at least partially spans the void. The interior component may have at least one receiver operable to (i) position the water-meter device within the water-meter enclosure, and/or (ii) prevent vertical displacement of the water-meter device when the lid is fitted to the water-meter enclosure.

The abutment surface of the frame may be annular and operable to provide uniform support to the frame when trapped between the water-meter enclosure and the lid. The interior component may include a vertical sidewall portion having an abutment surface operable to face a portion of the water-meter enclosure and prevent horizontal displacement of the frame relative to the water-meter enclosure when the lid is fitted to the water-meter enclosure. The at least one receiver of the interior component may be provided through a horizontal receiver portion of the interior component that extends perpendicular from the vertical sidewall portion of the interior component. The water-meter device may be secured to the at least one receiver of the interior component via a mounting assembly.

The mounting assembly may include upper and lower abutment elements operable to be received on a threaded member of the water-meter device so that the upper and lower abutment elements are secured on opposing sides of interior component when the water-meter device is secured to the water meter mounting bracket. The upper abutment element may include a tool-receiving means that is exposed through the void of the frame when the water-meter device is secured to the water meter mounting bracket. The interior component may include a plurality of receivers positioned about an outermost circumference of a horizontal receiver portion.

Other aspects and advantages of the present inventive concept will be apparent from the following detailed description of the preferred embodiments and the accompanying drawings figures.

BRIEF DESCRIPTION OF THE FIGURES

Embodiments of the present inventive concept are described herein with reference to the following drawing figures, wherein.

DETAILED DESCRIPTION

The present inventive concept is susceptible of embodiment in many forms. While the drawings illustrate, and the specification describes, certain embodiments of the invention, it is to be understood that such disclosure is by way of example only. The principles of the present inventive concept are not limited to the particular disclosed embodiments.

Figure 1:
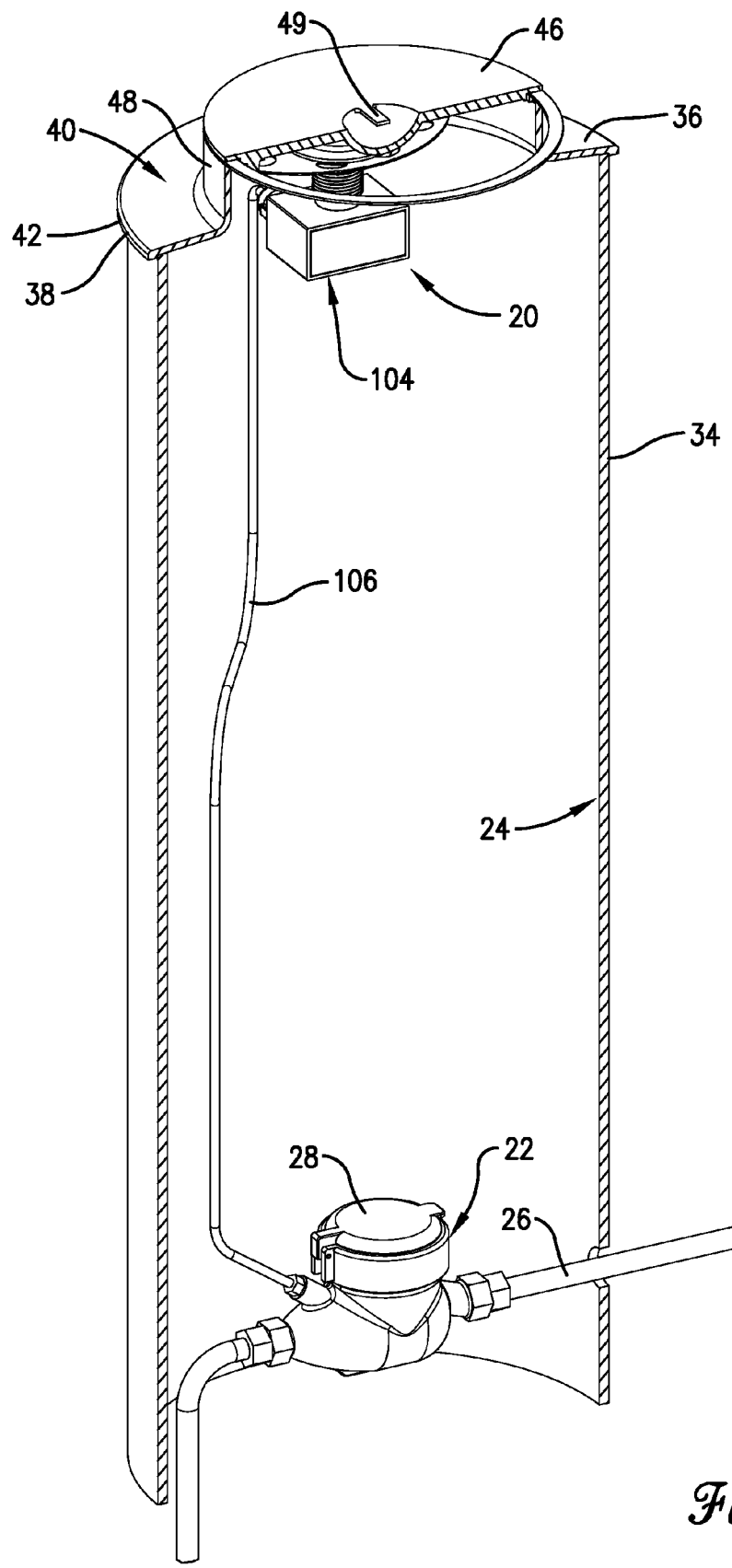
FIG. 1 is a perspective view of a water meter mounting bracket system in accordance with an exemplary embodiment of the present inventive concept, illustrating the system in use in a subsurface enclosure of a water meter and having an RF transmitter mounted thereto.

With initial reference to FIG. 1, a water meter mounting bracket system 20 is generally illustrated in an exemplary embodiment in use a water meter 22 that is installed in a water meter enclosure 24. The water meter 22 is installed along a length of a water pipe 26. The water meter 22 has a cap 28 that conceals a meter display operable to monitor a volume of water passing through the water meter 22, that is, water consumed by an end user via the water pipe 26. The water meter enclosure 24 has a below ground portion 34 that extends into the ground and an above ground portion 36 of the water meter enclosure 24 that extends to define an annular rim 38 that is at least level with and preferably slightly above the ground.

A cover 40 is secured to the above ground portion 36 of the water meter enclosure 24 so that the water meter enclosure 24 is fully closed. The cover 40 has an annular rim 42 that is sized and shaped to abut the annular rim 38 of the above ground portion 36. The rims 38, 42 may be sealed via welding or the like to prevent debris or other contaminates from entering the water meter enclosure 24.

The cover 40 includes a lid 46 that is removably secured to an elevated portion 48 of the cover 38 and more particularly, secured to a rim 50 of the elevated portion 48 of the cover 38. The elevated portion 48 spaces the lid 46 from the rims 38, 42 to deter the likelihood of debris or other contaminates from entering the water meter enclosure 24. The lid 46 provides selective access to the water meter enclosure 24 and is secured to the cover 40 via a locking means 49, which requires a key and/or tool to permit separation of the lid 46 from the cover 40. It is foreseen, however, that the lid 46 may be secured to the cover 40 via other means such as, but not limited to, gravity. Removal of the lid 46 from the cover 40 exposes the water meter mounting bracket system 20 and permits maintenance and/or repair operations for the water meter 22 and/or related components.

Figure 2:
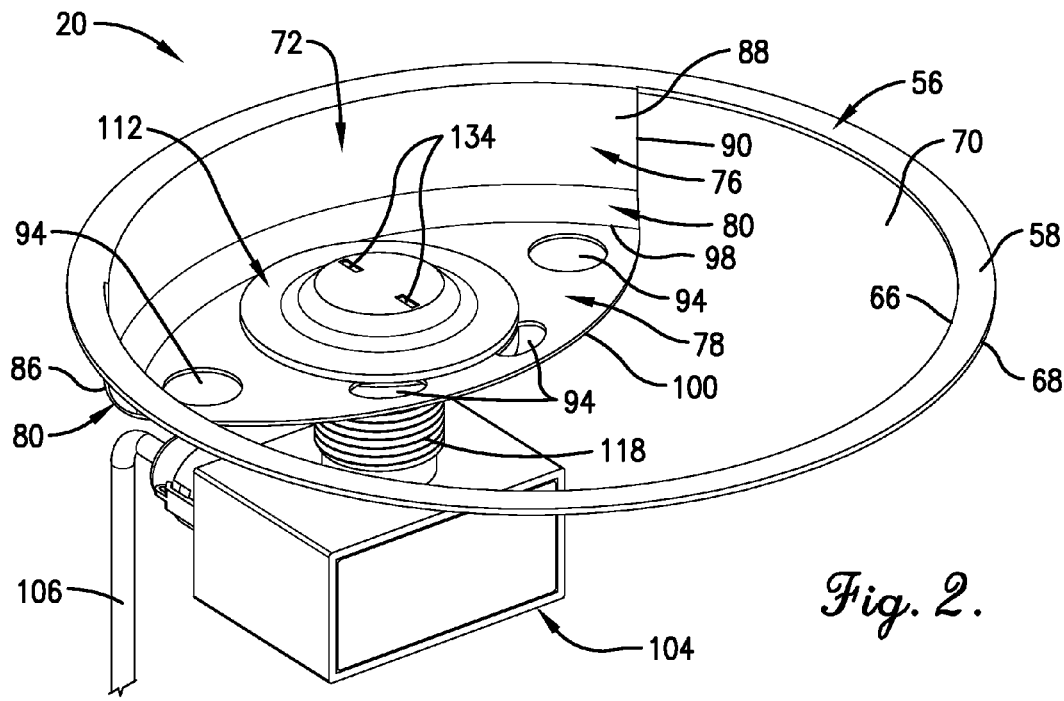
FIG. 2 is a magnified upper perspective view of the water meter mounting bracket system illustrated in FIG. 1.
Figure 3:
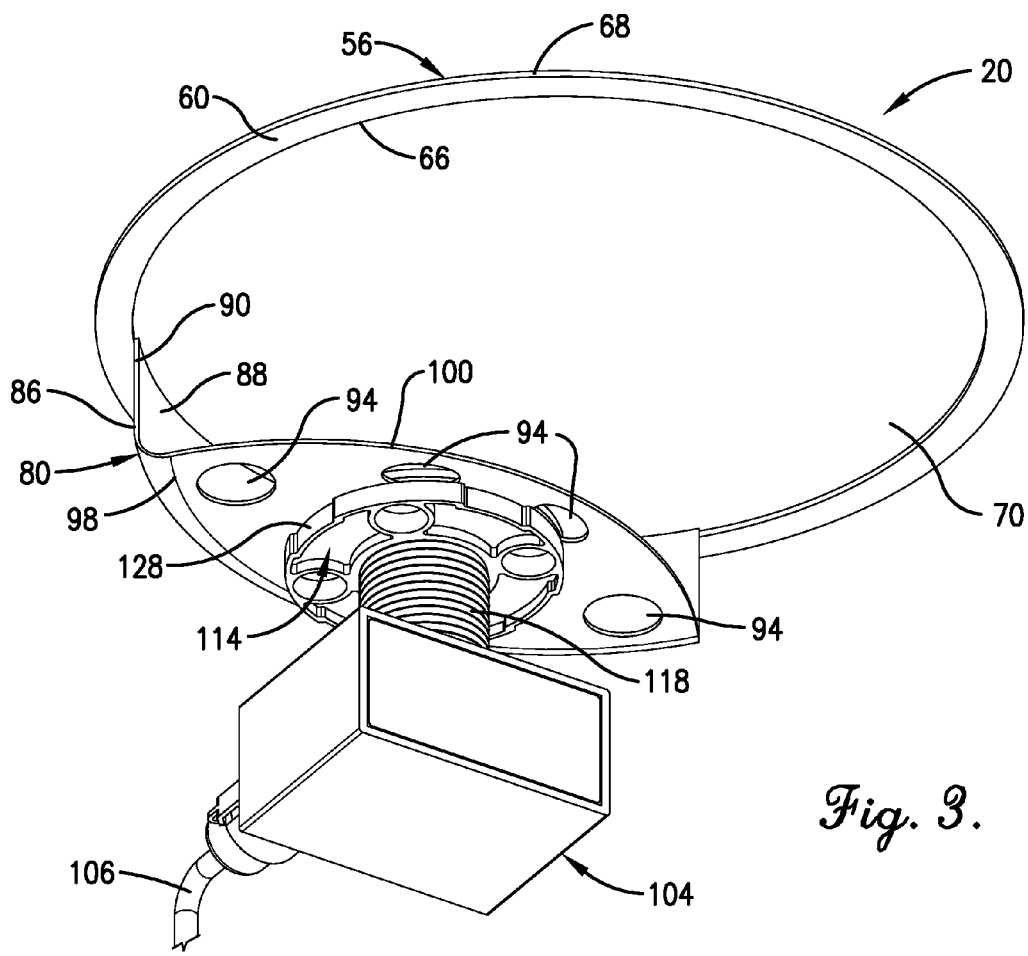
FIG. 3 is a magnified lower perspective view of the water meter mounting bracket system illustrated in FIG. 1.
Figure 4:
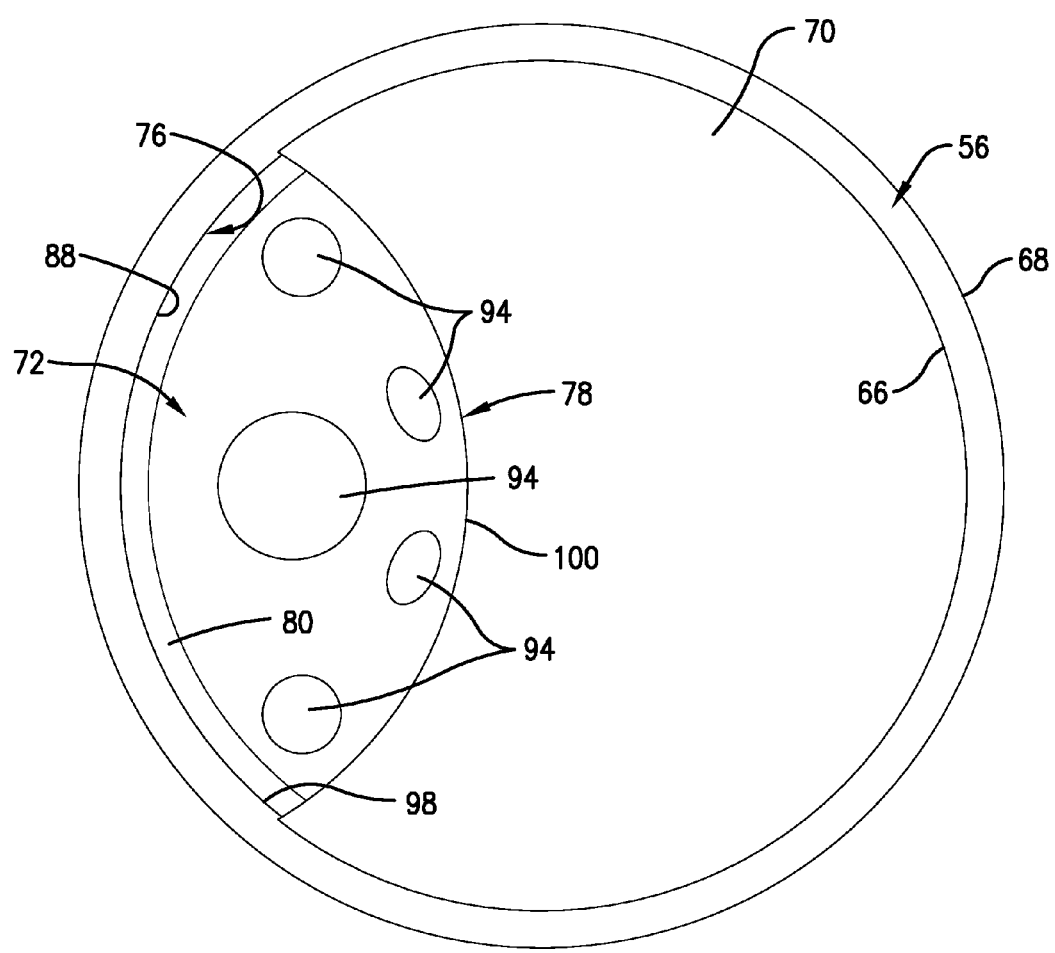
FIG. 4 is a top plan view of the water meter mounting bracket system illustrated in FIG. 1.

The water meter mounting bracket system 20 includes an annular frame 56 having upper and lower abutment surfaces 58, 60, as illustrated by FIGS. 2-4. The frame 56 is sized and shaped to at least partially extend and be trapped between the cover 40 and the lid 46. More particularly, the upper and lower abutment surfaces 58, 60 of the frame 56 are sized and shaped to respectively abut an entire outer portion of the lid 46 and the entirety of the rim 50 of the cover 40 so that the frame 56 is trapped therebetween when the lid 46 is fitted to the cover 46. In this manner, the frame 56 is uniformly supported by the inner portion of the cover 40 and trapped thereon by the lid 46.

The frame 56 includes inner and outer opposing perimeter edges 66, 68. The inner perimeter edge 66 defines a planar void 70 within and through an interior of the frame 56. An interior component 72 includes a vertical sidewall portion 76 that depends from the inner perimeter edge 66 of the frame 56 and extends perpendicularly from planes defined by the upper and lower abutments surfaces 58, 60 of the frame 56, and a horizontal receiver portion 78 that extends perpendicularly from the vertical sidewall portion 76 into the void 70. The portions 76, 78 are divided by a transition portion 80 having a degree of curvature defined by the frame 56 and is generally shaped like an "L."

The vertical sidewall portion 76 includes opposing rear abutment and front surfaces 86, 88 having a common edge 90. The rear abutment surface 86 faces and abuts a portion of the water meter enclosure 24, e.g., a sidewall of the water meter enclosure 24, when fitted thereto. In this manner, the rear abutment surface 86 prevents horizontal displacement of the frame 56 relative to the water meter enclosure 24 when the frame 56 is fitted to the water meter enclosure 24 and/or the lid 46 is fitted to the cover 40.

The horizontal receiver portion 78 has a plurality of apertures or receivers 94 extending therethrough. In the exemplary embodiment, the receivers 94 have circular and oval shapes of varying circumferences with one of the receivers 94 being circular and positioned centrally relative to the horizontal receiver portion 78 and a plurality of the receivers 94 being circular and oval positioned about the one of the receivers 94 and about a perimeter of the horizontal receiver portion 78. It is foreseen, however, that any number of the receivers 94 could be provided 94 of any size and/or shape without deviating from the scope of the present inventive concept. For example, the plurality of receivers 94 could include a single receiver 94.

The horizontal receiver portion 78 includes an innermost edge, defined by the vertical sidewall portion 76, and an outermost edge 100 that are convex relative to each other with radiuses that are substantially identical to each other. In the exemplary embodiment, the horizontal receiver portion 78 preferably extends into less than 50% of the void 70, and more preferably into approximately 33% of the void. In this manner, the horizontal receiver portion 78 does not entirely conceal or otherwise restrict access to the water meter 22 and/or related components when the water meter mounting bracket system 20 is installed in the water meter enclosure 24.

A water meter component 104 is mounted to the water meter mounting bracket system 20 in a vertically-spaced orientation from the water meter 22, for instance, to provide a better position for transmitting a signal, that is, a position that is closer to a surface of the ground. Thus, the water meter component 104 may be a transmitter or the like that is wired to the water meter 22 via a wire 106.

To mount a water-meter component 104 to the water meter mounting bracket system 20, a mounting assembly 110 is provided. The mounting assembly 110 includes upper and lower abutment elements 112, 114 that are each sized and shaped to be received on an elongated threaded member 118 of the component 104. It is foreseen that that threaded member 118 may be manufactured with the component 104 or retrofitted to the component 104 thereafter to enable use of the component 104 with the water meter mounting bracket system 20 without deviating from the scope of the present inventive concept. It is also foreseen that the threaded member 118 may have a smooth, ribbed, and/or threaded surface to enable secure mating between the upper and lower abutment elements 112, 114 without deviating from the scope of the present inventive concept.

Figure 5:
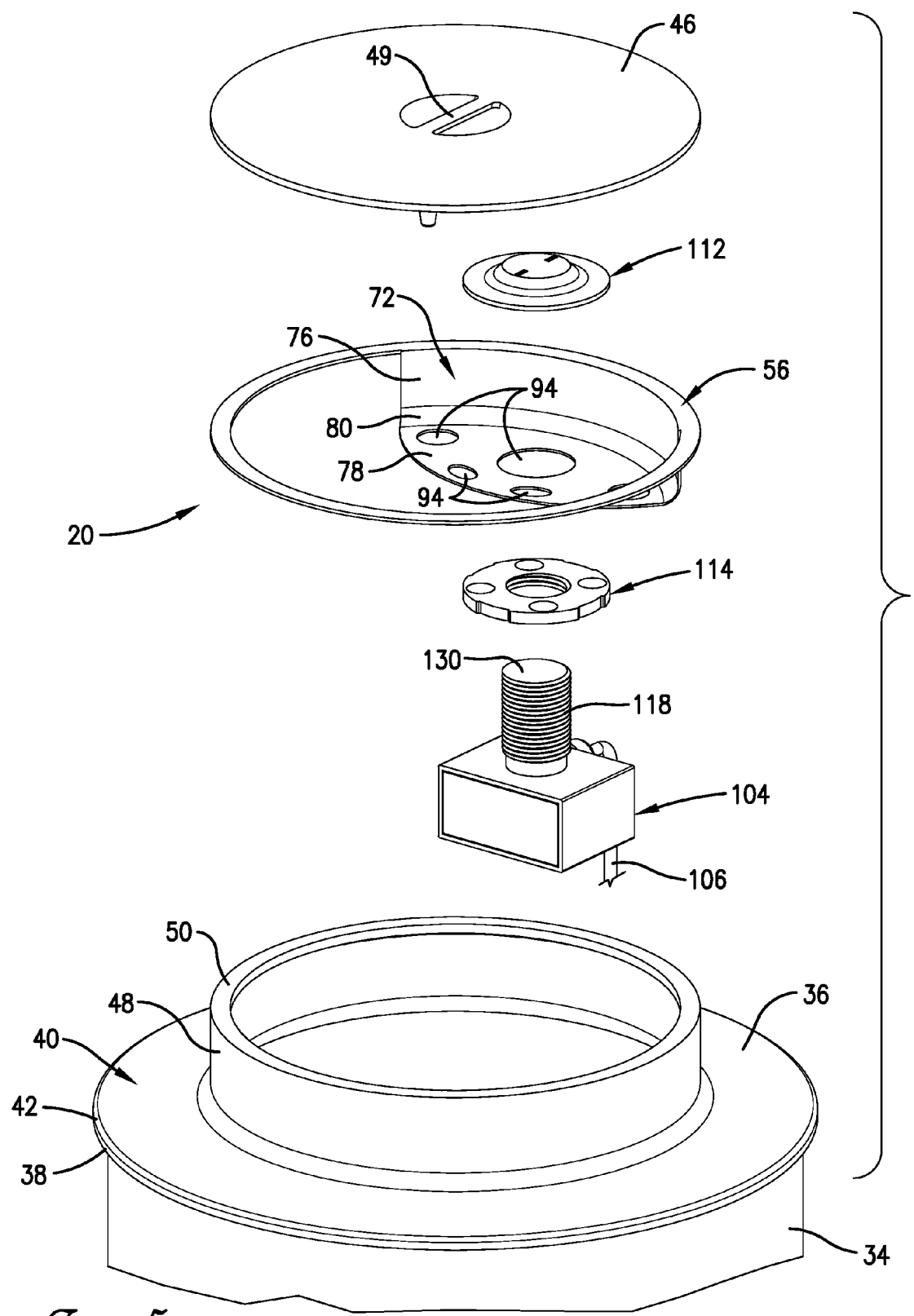
FIG. 5 is a magnified, exploded partial view of the water meter mounting bracket system illustrated in FIG. 1.

Turning to FIG. 5, the component 104 is mounted to the water meter mounting bracket system 20 by fitting the lower abutment element 114 onto the threaded member 118 via rotation or threading. More particularly, one or more internal ribs or threads about an internal circumference of the lower abutment element 114 are threaded onto external threads about an external circumference of the threaded member 118. A textured and/or notched gripping surface is provided about an outer circumference of the lower abutment element 114 to facilitate gripping and threading of the lower abutment element 114.

With the lower abutment element 114 secured to and along the threaded member 118, an end 130 of the component 104 is extended at least partially through one of the plurality of receivers 94. In the exemplary embodiment, the end 130 is extended partially through a central one of the plurality of receivers 94, as illustrated in FIGS. 2 and 3. With the end 130 extended through the central one of the plurality of receivers 94, the upper abutment element 112 is fitted onto the threaded member 118 via rotation or threading. Similar to the fitting process of the lower abutment element 114, one or more internal ribs or threads about an internal circumference of the upper abutment element 112 are threaded onto the external threads about the external circumference of the threaded member 118. A tool receiver 134 is provided on the upper abutment element 112 to facilitate threading of the upper abutment element 112. In this manner, the upper and lower abutment elements 112, 114 respectively abut upper and lower surfaces 138, 140 of the horizontal receiver portion 78, thereby trapping the horizontal receiver portion 78 therebetween with the threaded member 118 and component 104 secured thereto.

The upper abutment element 112 includes tool-receiving means 134 is exposed through the void 70 when the water meter mounting bracket system 20 is secured to the water meter enclosure 24. With the component 104 secured to the frame 56, the frame 56 is placed on the rim 50 of the cover 40 and held in place via gravity. The vertical sidewall portion 78 orients the component 104 so that it slightly extends into and is housed within the water meter enclosure 24. The lid 46 is then placed on the frame 56 and/or cover 40 so that the frame 56 is trapped between the cover 40 and lid 46. In this manner, the lid 46 seals or closes the water meter enclosure 24 so that the component 104 is securely housed therein, thereby preventing vertical displacement of the frame 56 relative to the water meter enclosure 24 and also decreasing the likelihood of damage to the component 104.

Figure 6:
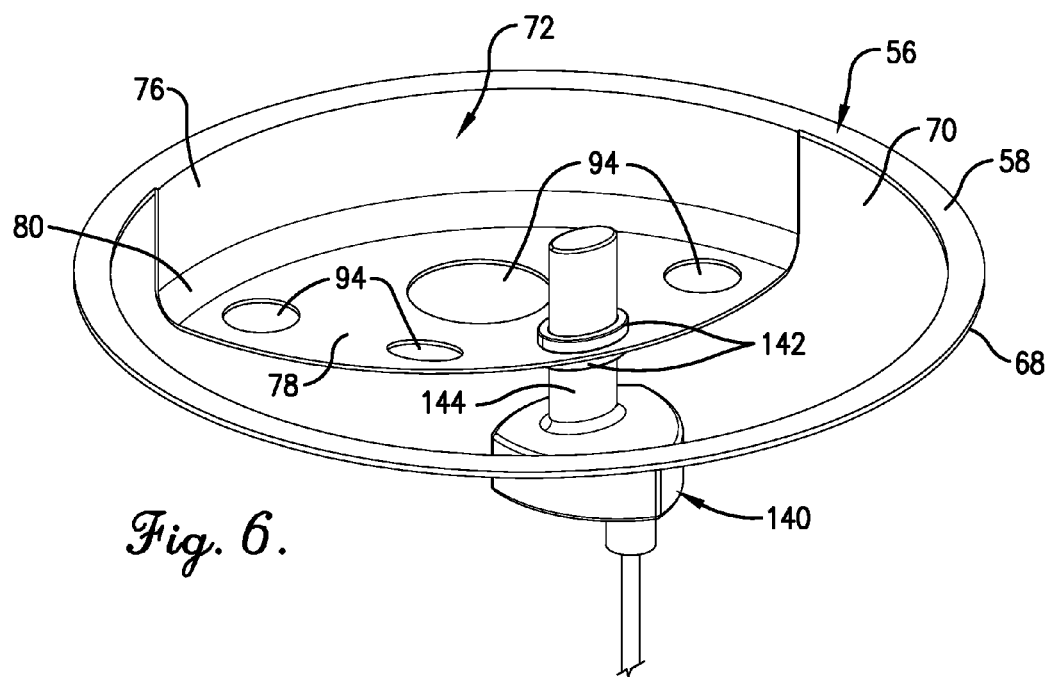
FIG. 6 is a magnified upper perspective view of the water meter mounting bracket system illustrated in FIG. 1, illustrating the system in use with another component.
Figure 7:
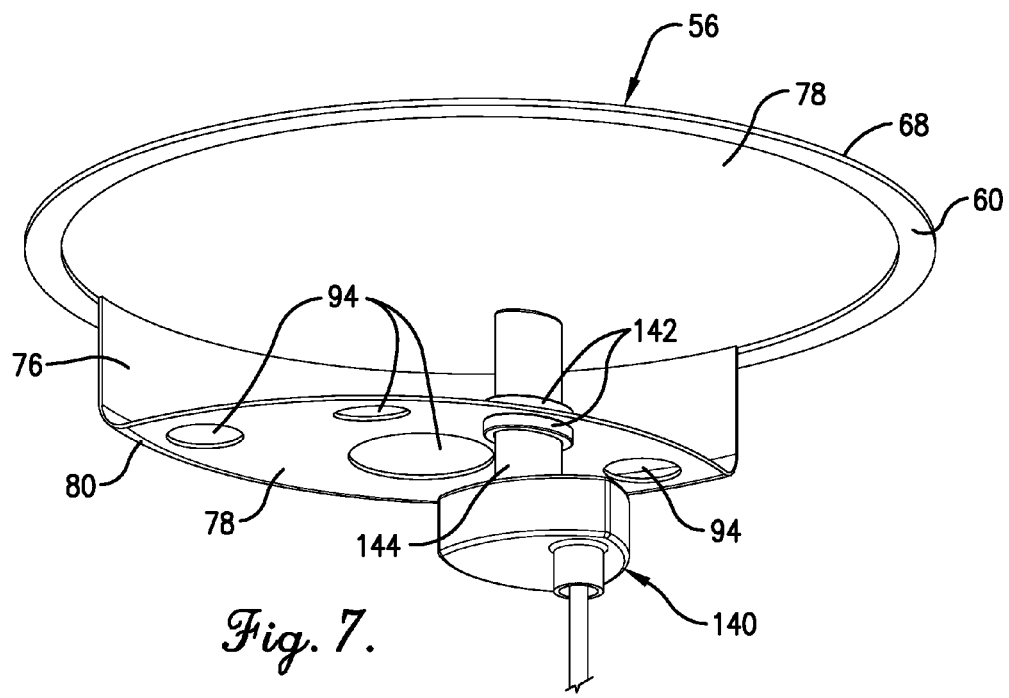
FIG. 7 is a magnified lower perspective view of the water meter mounting bracket system illustrated in FIG. 1, illustrating the system in use with another component.

FIGS. 6 and 7 illustrated another water meter component 140 secured to the horizontal receiver portion 78 via another one of the receivers 94. The another water meter component 140 is secured via a plurality of elastic members 142 that are secured to and trap an elongated portion 144 of the another water meter component 140 within the another one of the receivers 94. The plurality of elastic members 142 are made of an elastic material such as, but not limited to, rubber or the like, thereby providing a friction-fit engagement along the elongated portion 144 of the another water meter component 140.

The water meter mounting bracket system 20 may be manufactured using plastic and/or metal or the like. In the exemplary embodiment, the frame 56 is thermoformed using a durable material that is not brittle, provides low water absorption, good dimensional stability, high abrasion resistance, and with good electrical properties, such as, but not limited to, high-density polyethylene plastic or acrylonitrily-butadiene-styrene plastic. In other words, the frame 56 and the interior component 72 are formed from a single sheet of plastic that is heated and then deformed to form the interior component 72, and then cut, via a c-n-c machine or the like, to form the plurality of receivers 94 and the edges 66, 68, 90, 100.

The preferred forms of the invention described above are to be used as illustration only, and should not be used in a limiting sense to interpret the scope of the present inventive concept. Modifications to the exemplary embodiments, set forth above, could be readily made by those skilled in the art without departing from the spirit of the present inventive concept.

The inventors hereby state their intent to rely on the Doctrine of Equivalents to determine and assess the reasonably fair scope of the present inventive concept as it pertains to any apparatus not materially departing from but outside the literal scope of the invention as set forth in the following claims.

What is claimed is:

1. A water meter bracket system comprising:
   a frame defining a planar void on an interior thereof, the frame having an abutment surface operable to engage a surface of water-meter enclosure having a lid; and
   an interior component depending from the frame and at least partially spanning the void, the interior component having at least one receiver operable to (i) position a water-meter device within the water-meter enclosure, and (ii) prevent vertical displacement of the water-meter device when the lid is fitted to the water-meter enclosure,
   wherein,
      the abutment surface of the frame is operable to be uniformly supported about an entire perimeter of the water-meter enclosure when trapped between the surface of the water-meter enclosure and the lid of the water-meter enclosure,
      the interior component includes (i) a vertical sidewall portion depending from the frame and having a convex rear surface and a concave front surface, and (ii) a horizontal receiver portion extending perpendicularly from the vertical sidewall portion and having a concave outermost edge that extends toward a center of the planar void, and
      the outermost edge of the horizontal receiver portion extending between edges of the vertical sidewall portion.

2. The water meter mounting bracket system of claim 1, wherein the abutment surface of the frame is annular.

3. The water meter mounting bracket system of claim 1, wherein the vertical sidewall portion includes an abutment surface operable to face a portion of the water-meter enclosure and prevent horizontal displacement of the frame relative to the water-meter enclosure when the lid is fitted to the water-meter enclosure.

4. The water meter mounting bracket system of claim 3, wherein the at least one receiver of the interior component is provided through the horizontal receiver portion of the interior component that extends perpendicular from the vertical sidewall portion of the interior component.

5. The water meter mounting bracket system of claim 1, and
   a mounting assembly operable to secure the water-meter device to the at least one receiver of the interior component.

6. The water meter mounting bracket system of claim 5, wherein
   the mounting assembly includes upper and lower abutment elements operable to be received on a threaded member of the water-meter device so that the upper and lower abutment elements are secured on opposing sides of interior component when the water-meter device is secured to the water meter mounting bracket, and
   the upper abutment element includes a tool-receiving means that is exposed through the void of the frame when the water-meter device is secured to the water meter mounting bracket.

7. The water meter mounting bracket system of claim 1, wherein the interior component spans less than 50% of the void.

8. The water meter mounting bracket system of claim 1, wherein the horizontal receiver portion includes a plurality of receivers spaced about the outermost edge of the horizontal receiver portion, the outermost edge of the horizontal receiver portion having a radius substantially equal to a radius of the innermost edge of the horizontal receiver portion.

9. A method of manufacturing a water meter mounting bracket system, the method comprising the steps of:
   forming a frame having an abutment surface operable to engage a surface of a water meter enclosure having a lid; and
   forming an interior component that depends from the frame and at least partially spans a void, the interior component having at least one receiver operable to (i) position a water-meter device within the water-meter enclosure, and (ii) prevent vertical displacement of the water-meter device when the lid is fitted to the water-meter enclosure,
   wherein,
      the abutment surface of the frame is operable to be uniformly supported about an entire perimeter of the water-meter enclosure when trapped between the surface of the water-meter enclosure and the lid of the water-meter enclosure,
      the interior component includes (i) a vertical sidewall portion depending from the frame and having a convex rear surface and a concave front surface, and (ii) a horizontal receiver portion extending perpendicularly from the vertical sidewall portion and having a concave outermost edge that extends toward a center of the planar void, and
      the outermost edge of the horizontal receiver portion extending between edges of the vertical sidewall portion.

10. The method of claim 9, wherein the abutment surface of the frame is annular.

11. The method of claim 9, wherein the vertical sidewall portion includes an abutment surface operable to face a portion of the water-meter enclosure and prevent horizontal displacement of the frame relative to the water-meter enclosure when the lid is fitted to the water-meter enclosure.

12. The method of claim 11, wherein the at least one receiver of the interior component is provided through the horizontal receiver portion of the interior component that extends perpendicular from the vertical sidewall portion of the interior component.

13. A method of mounting a component of a water meter to a bracket system, the method comprising the steps of;
    securing a frame to a water-meter enclosure having a lid, the frame having a planar void on an interior thereof and opposing abutment surfaces operable to engage surfaces of the water-meter enclosure and the lid; and
    securing a water-meter device to an interior component that depends from the frame and at least partially spans the void, the interior component having at least one receiver operable to (i) position the water-meter device within the water-meter enclosure, and (ii) prevent vertical displacement of the water-meter device when the lid is fitted to the water-meter enclosure,
    wherein,
        the abutment surface of the frame is operable to be uniformly supported about an entire perimeter of the water-meter enclosure when trapped between the surface of the water-meter enclosure and the lid of the water-meter enclosure,
        the interior component includes (i) a vertical sidewall portion depending from the frame and having a convex rear surface and a concave front surface, and (ii) a horizontal receiver portion extending perpendicularly from the vertical sidewall portion and having a concave outermost edge that extends toward a center of the planar void, and
        the outermost edge of the horizontal receiver portion extending between edges of the vertical sidewall portion.

14. The method of claim 13, wherein the abutment surface of the frame is annular.

15. The method of claim 13, wherein the vertical sidewall portion includes an abutment surface operable to face a portion of the water-meter enclosure and prevent horizontal displacement of the frame relative to the water-meter enclosure when the lid is fitted to the water-meter enclosure.

16. The method of claim 13, wherein the at least one receiver of the interior component is provided through the horizontal receiver portion of the interior component that extends perpendicular from the vertical sidewall portion of the interior component.

17. The method of claim 13, wherein the water-meter device is secured to the least one receiver of the interior component via a mounting assembly.

18. The method of claim 17, wherein the mounting assembly includes upper and lower abutment elements operable to be received on a threaded member of the water-meter device so that the upper and lower abutment elements are secured on opposing sides of interior component when the water-meter device is secured to the water meter mounting bracket.

19. The method of claim 18, wherein the upper abutment element includes a tool-receiving means that is exposed through the void of the frame when the water-meter device is secured to the water meter mounting bracket.

20. The method of claim 13, wherein the interior component includes a plurality of receivers positioned about an outermost circumference of the horizontal receiver portion.

* * * * *